(12) United States Patent
Kim et al.

(10) Patent No.: US 8,933,911 B2
(45) Date of Patent: Jan. 13, 2015

(54) TOUCH PANEL INTEGRATED DISPLAY DEVICE

(75) Inventors: Sung-Chul Kim, Paju-si (KR); Moon-Bong Song, Seoul (KR)

(73) Assignee: LG Display Co., Ltd., Seoul (KR)

( * ) Notice: Subject to any disclaimer, the term of this patent is extended or adjusted under 35 U.S.C. 154(b) by 583 days.

(21) Appl. No.: 13/152,137

(22) Filed: Jun. 2, 2011

(65) Prior Publication Data

US 2011/0298756 A1  Dec. 8, 2011

(30) Foreign Application Priority Data

Jun. 3, 2010 (KR) .................. 10-2010-0052250
May 20, 2011 (KR) .................. 10-2011-0048165

(51) Int. Cl.
*G06F 3/042* (2006.01)
*G06F 3/041* (2006.01)

(52) U.S. Cl.
CPC .................. *G06F 3/0412* (2013.01)
USPC ............................................ 345/175

(58) Field of Classification Search
USPC .................................. 345/175–176
See application file for complete search history.

(56) References Cited

U.S. PATENT DOCUMENTS

| | | | | |
|---|---|---|---|---|
| 4,507,557 A * | 3/1985 | Tsikos | .......... | 250/341.7 |
| 6,498,602 B1 * | 12/2002 | Ogawa | .......... | 345/173 |
| 6,504,530 B1 * | 1/2003 | Wilson et al. | .......... | 345/173 |
| 7,538,894 B2 * | 5/2009 | Kobayashi | .......... | 356/614 |
| 7,573,465 B2 * | 8/2009 | Lieberman et al. | .......... | 345/175 |
| 7,705,835 B2 * | 4/2010 | Eikman | .......... | 345/176 |
| 8,167,698 B2 * | 5/2012 | Van De Wijdeven et al. | .. | 463/14 |
| 8,203,540 B2 * | 6/2012 | Cernasov | .......... | 345/175 |
| 8,319,751 B2 * | 11/2012 | Challener et al. | .......... | 345/175 |
| 8,405,636 B2 * | 3/2013 | Bridger | .......... | 345/175 |
| 8,466,901 B2 * | 6/2013 | Yen et al. | .......... | 345/175 |
| 8,676,007 B2 * | 3/2014 | Holmgren et al. | .......... | 385/33 |
| 2001/0022579 A1 * | 9/2001 | Hirabayashi | .......... | 345/175 |
| 2002/0033805 A1 * | 3/2002 | Fujioka et al. | .......... | 345/175 |
| 2004/0140961 A1 * | 7/2004 | Cok | .......... | 345/175 |
| 2005/0128190 A1 * | 6/2005 | Ryynanen | .......... | 345/173 |
| 2006/0237540 A1 * | 10/2006 | Saxena et al. | .......... | 235/454 |
| 2007/0200835 A1 * | 8/2007 | Choo et al. | .......... | 345/177 |
| 2008/0231791 A1 * | 9/2008 | Tanabe et al. | .......... | 349/150 |
| 2009/0058833 A1 * | 3/2009 | Newton | .......... | 345/175 |
| 2009/0135162 A1 * | 5/2009 | Van De Wijdeven et al. | | 345/175 |
| 2009/0213094 A1 | 8/2009 | Bridger | | |
| 2010/0309169 A1 * | 12/2010 | Lieberman et al. | .......... | 345/175 |
| 2011/0096034 A1 * | 4/2011 | Huang | .......... | 345/175 |
| 2011/0157097 A1 * | 6/2011 | Hamada et al. | .......... | 345/175 |

FOREIGN PATENT DOCUMENTS

| | | |
|---|---|---|
| CN | 101063921 A | 10/2007 |
| JP | 2001-290602 A | 10/2001 |
| TW | 200504571 | 2/2005 |

(Continued)

*Primary Examiner* — Christopher E Leiby

(74) *Attorney, Agent, or Firm* — Birch, Stewart, Kolasch & Birch, LLP

(57) ABSTRACT

A touch panel integrated display device which can reduce an entire thickness and weight and which can prevent display quality deterioration is discussed. The touch panel integrated display device includes a display panel comprising a plurality of pixels, to display an image; a touch panel formed on an top peripheral area of the display panel, to sense a touch generated on the display panel.

10 Claims, 17 Drawing Sheets

(56) References Cited

FOREIGN PATENT DOCUMENTS

| | | |
|---|---|---|
| TW | 200941306 | 10/2009 |
| WO | WO 03/046878 A1 | 6/2003 |
| WO | WO 2010/004384 A1 | 1/2010 |
| WO | WO 2010024008 A1 * | 3/2010 |

* cited by examiner

TOUCH PANEL INTEGRATED DISPLAY DEVICE

CROSS REFERENCE TO RELATED APPLICATION

This application claims the benefit of the Korean Patent Application No. 10-2010-0052250, filed on Jun. 3, 2010, and the Korean Patent Application No. 10-2011-0048165, filed on May 20, 2011, all of which are hereby incorporated by reference as if fully set forth herein.

BACKGROUND OF THE DISCLOSURE

1. Field of the Disclosure

The present invention relates to a touch panel integrated display device which can reduce an entire thickness and weight and which can prevent display quality deterioration.

2. Discussion of the Related Art

With serious start of an information age, a display field which presents electrical information signals visually has been developed drastically. A variety of flat display devices having compact-sizes, lightweights and low power consumption have been developed and replaced conventional cathode ray tubes (CRT).

Such a flat display device includes a liquid crystal display device (LCD), a plasma display panel device (PDP), a field emission display device (FED), an electro luminescence display device (ELD) and an electro-wetting display (EWD). The flat display device has to have a display panel configured to display images, with a pair of insulation substrates bonded with each other in opposite, having a light-emitting material layer or polarized material layer disposed there between.

A liquid crystal display device is a device which can display images by using a light transmittance of liquid crystal which can be adjusted according to an electric field. The liquid crystal display device has advantages of a small-sized, slim appearance and low power consumption. Because of that, the liquid crystal display devices have been applied to notebooks, office automation devices and audio/video devices broadly.

Typically, each of personal computers, portable communication devices and the other personal information processing devices forms an interface with a user via an input device including a keyboard, mouse, digitizer, etc. Recently, it is difficult for the input device such as a keyboard and a mouse to enhance a degree of completion of a product, as development of mobile communication equipments have been expanded in recent. Because of that, input devices with a high portability which can be used more simply have been developed continuously and a touch panel allowing information to be input via a direct touch of a screen, using his or her finger or pen has been proposed.

The touch panel enables letters to be input simply with fewer malfunctions, if auxiliary letter input devices are not provided and it is easy to carry with and for the user to recognize a user manual. Because of those advantages, the touch panels have been applied to a variety of information processing devices recently. Especially, when the user selects an icon or keyboard displayed on a screen, a corresponding icon or keyboard provided in the touch panel may be selected to input information. To enable that, a flat display device including such the touch panel has been applied to a portable information processing device such as a personal computer and a mobile phone often. A touch panel attached liquid crystal display device which includes a touch panel attached to a liquid crystal panel provided therein is proposed as one of flat display devices including the touch panels.

FIG. 1 is a diagram illustrating a conventional touch panel attached liquid crystal display device.

As shown in FIG. 1, the conventional touch panel attached liquid crystal display device includes a liquid crystal panel 10 configured to display images by adjusting a light transmittance of each pixel using a direction of liquid crystal cells, a touch panel 20 configured to sense a touch, and a adhesive layer 30 configured to bond the liquid crystal panel 10 with the touch panel 20.

The liquid crystal panel 10 includes a pair of substrates oppositely bonded with each other, with a liquid crystal layer located there between, a transistor array provided on either of the two substrates to define each of pixel regions corresponding to each of the pixels and to control brightness of each pixel, and a color filter array provided on either of the substrates to transmit various color lights corresponding to the pixels, respectively. First and second polarization layers 11 and 12 are formed on top and bottom surfaces of the liquid crystal panel 10, respectively. The first polarization layer 11 polarizes a light incident to the liquid crystal panel 10 and the second polarization layer 12 polarizes lights emitted from the liquid crystal panel 10.

The touch panel 20 includes a transparent substrate 21 provided as waveguide to allow a light transmitted with less loss, light sources 22 adjacent to the transparent substrate 21 to project a light into the transparent substrate 21, a reflective plate 23 adjacent to the transparent substrate 21, opposite to the light sources 22, to reflect the light transmitting the inside of the transparent substrate 21 and to supply lights traveling straight in parallel to a top surface of the transparent substrate 21, and a sensor 24 formed on a peripheral area of the top surface of the transparent substrate 21, opposite to the reflective plate 23, to collect the lights passing along the top surface of the transparent substrate 21. Such the touch panel 20 detects a coordinate corresponding to the sensor 24 not receiving the light, by using that the light passing along the top surface of the transparent substrate 21 is reflected by a touch generated at a predetermined area of the transparent substrate 21, only to detect a coordinate of a touch point.

According to the prior art, the light emitted from the light source 22 can reach the sensor 24 only via the process of transmitting the inside of transparent substrate, the process of being reflected by the reflective plate and the process of the straight-moving over the top surface of the transparent substrate 21. That is, quite a large percentage of the radiation intensity of the lights emitted from the light source 22 may be decreased by a long light passage to the sensor 24. Because of that, the light collected in the sensor 24 has a relatively small quantity of the radiation intensity only to have a high possibility of failing to be effectively recognized by a control unit (not shown). As a result, it is limited to improve a touch sensing sensitivity of the touch panel.

Furthermore, according to the conventional touch panel attached liquid crystal display device, the liquid crystal panel 10 including the pair of the substrates and the touch panel 20 including the auxiliary transparent substrate 21 are provided independently. After that, the touch panel 20 is adhered to the liquid crystal panel 10 by the adhesive layer 30. The pair of the substrates of the liquid crystal panel 10 and the transparent substrate 21 of the touch panel 20 are provided independently. Because of that, it is limited to reduce the entire weight and thickness of the conventional touch panel integrated display device. In addition, the bonding process between the liquid crystal panel 10 and the touch panel 20 has to be performed.

Because of that, a manufacturing process can be complex and it can be difficult to improve the yield.

A still further, the light emitted from the liquid crystal panel 10 to display an image (hereinafter, "display light") has to pass the adhesive layer 30 and the touch panel 20, to be emitted outside. Because of that, a transmittance of the display light happens to be lowered, and thus the image quality of the liquid crystal panel 10 might deteriorate disadvantageously.

SUMMARY OF THE DISCLOSURE

Accordingly, the present invention is directed to a touch panel integrated display device. An object of the present invention is to provide a touch panel integrated display device which can reduce an entire weight and thickness thereof in comparison to the related art, even with a touch panel and a display panel, and which can improve an image quality of a display panel and a touch sensing sensitivity of a display panel, even with the touch panel and the liquid crystal panel.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch panel integrated display device includes a display panel comprising a plurality of pixels, to display an image; a touch panel formed on an top peripheral area of the display panel, to sense a touch generated on the display panel. The touch panel may include a plurality of light sources comprising at least one arranged at each edge of the top peripheral area of the display panel, to emit lights toward the top surface of the display panel; a plurality of sensors arranged at each edge of the top peripheral area of the display panel, spaced apart from each other with an identical distance, to collect the lights having passed over the top surface of the display panel after emitted from the plurality of the light sources; a waveguide comprising a plurality of cores connected with the plurality of the sensors and a cladding formed to surround the plurality of the cores, with a lower refractive index than the plurality of the cores; and a sensor controller connected with the plurality of the sensors via the plurality of the cores, to sense whether each of the sensors collects lights to calculate a coordinate of a touch.

Therefore, the touch panel integrated display device according to the present invention includes the touch panel formed on a peripheral area of the top surface of the display panel. Because of that, an auxiliary supporting substrate provided in the touch panel may be eliminated. As a result, the entire thickness and weight of the touch panel integrated display device may be reduced, and thus portability thereof may be improved.

Furthermore, according to conventional art, touch panel and display panel are attached by adhesive layer there between, so that the light emitted from the display panel are reflected or lost by the adhesive layer and the supporting substrate of the touch panel. As a result, an image quality may be deteriorated. In contrast, the touch panel integrated display device according to the present invention includes the touch panel directly formed on the display panel, without an auxiliary supporting substrate for the touch panel, and thus the lights emitted from the display panel may be emitted outside straightaway, not passing the adhesive layer and the supporting substrate of the touch panel. As a result, the image quality may be enhanced. In addition, the supporting substrate of the touch panel and the adhesive layer are eliminated. As a result, the structure of the touch panel integrated display device may be simple and it is easy to perform the manufacture process. As a result, a yield may be enhanced.

A still further, according to the present invention, the lights emitted from the light sources are collected by the sensors directly after passing over the top surface of the display panel. Because of that, the less radiation intensity generated by the light path may be reduced in comparison to the conventional art and a touch sensing sensibility of the touch panel may be enhanced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

As follows, a touch panel integrated display device according to en exemplary embodiment of the present invention will be described in detail in reference to the accompanying drawings.

Figure 1:
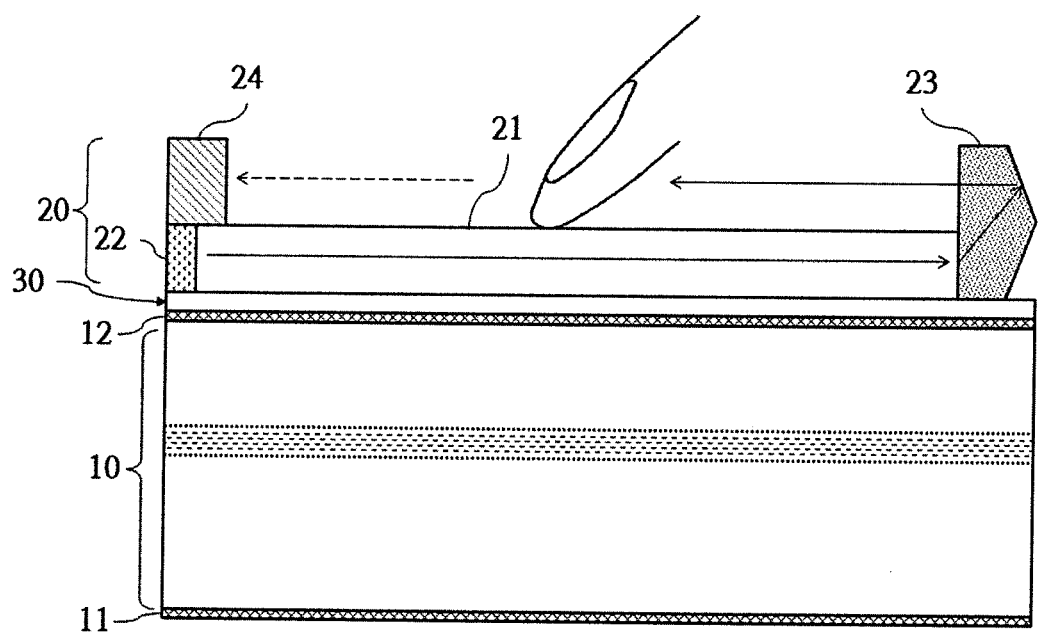
FIG. 1 is a diagram illustrating a conventional touch panel attached liquid crystal display device.
Figure 2:
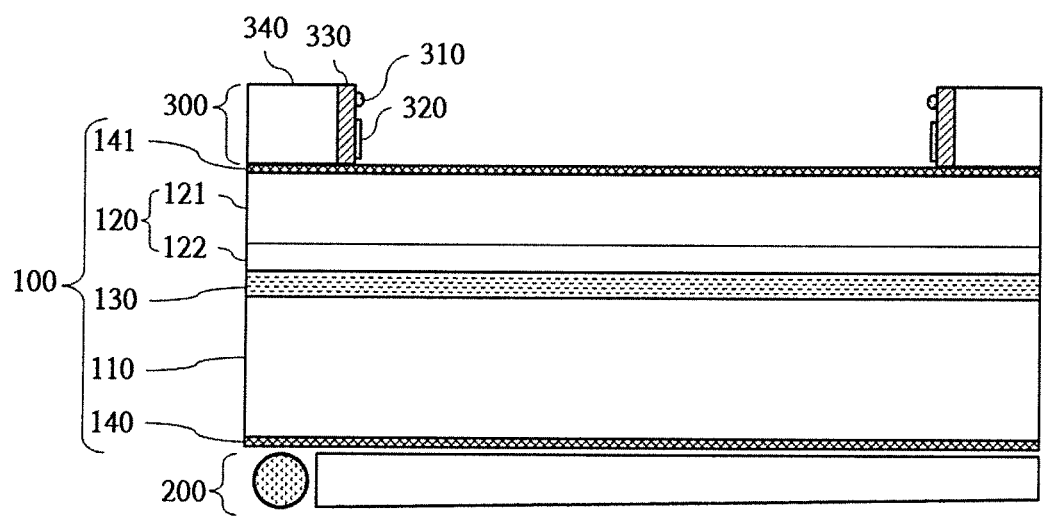
FIG. 2 is a sectional view illustrating a touch panel integrated display device according to a first embodiment of the present invention.
Figure 3:
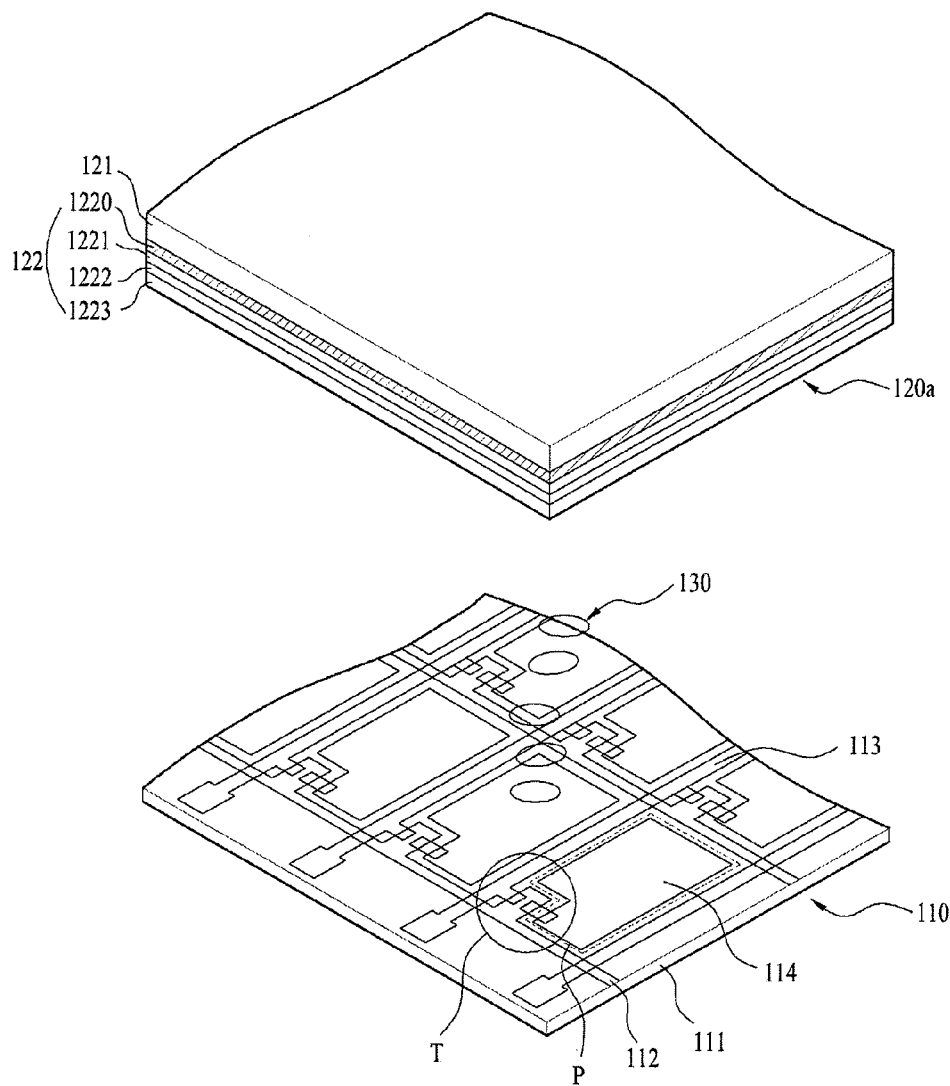
FIG. 3 is a perspective view illustrating a TN mode liquid crystal panel of the touch panel integrated display device according to the first embodiment of the present invention.
Figure 4:
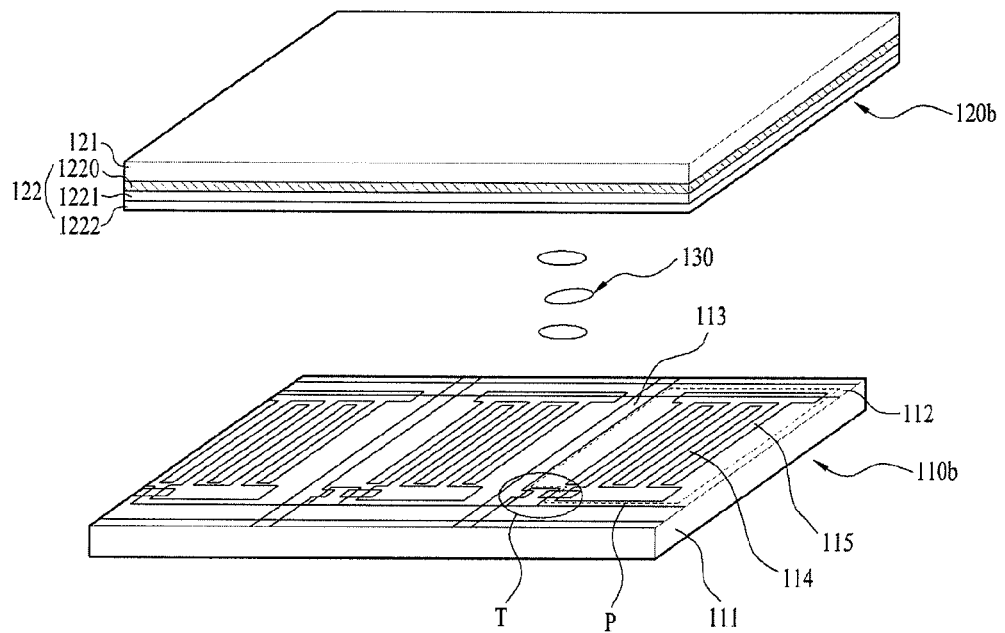
FIG. 4 is a perspective view illustrating a In-plain switching liquid crystal panel of the touch panel integrated display device according to the first embodiment of the present invention.
Figure 5:
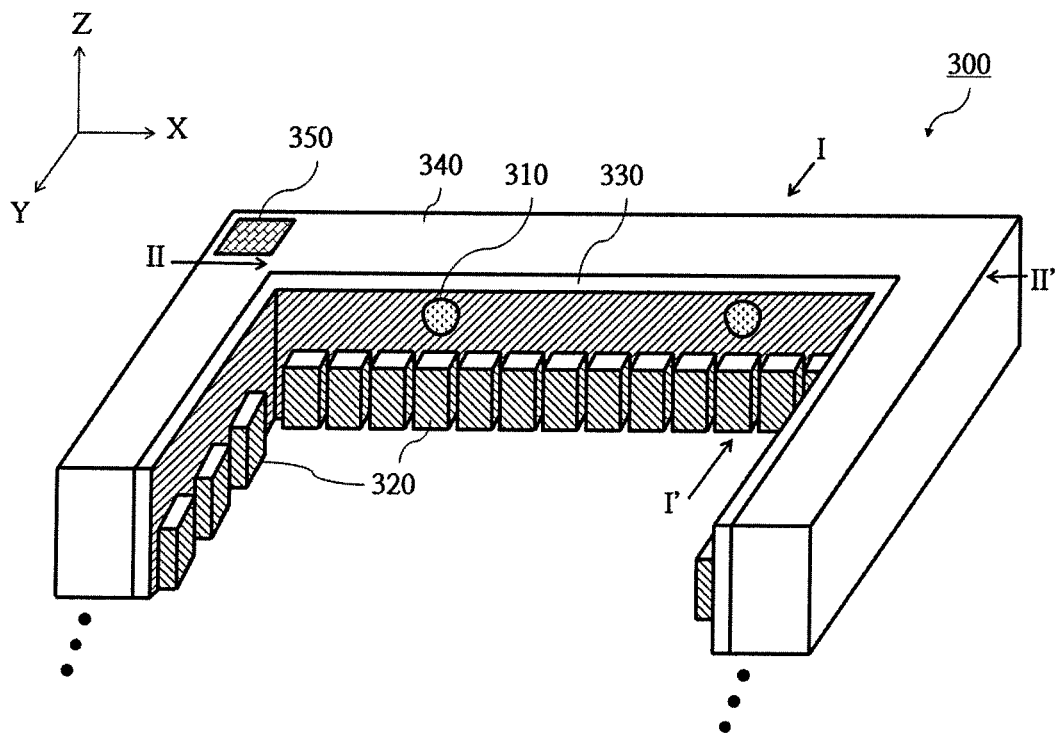
FIG. 5 is a perspective view partially illustrating a touch panel of the touch panel integrated display device according to the first embodiment of the present invention.
Figure 6A:
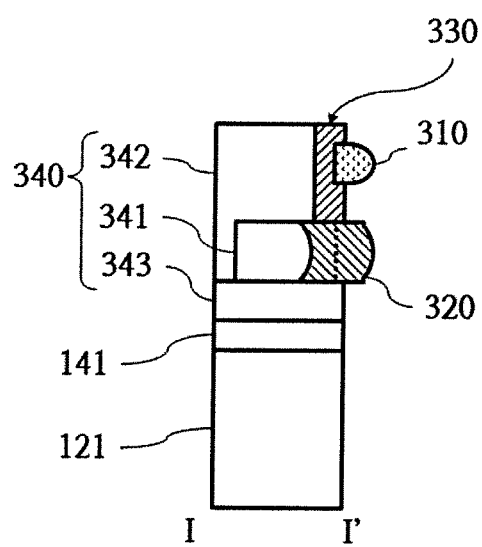
FIG. 6A is a YZ direction sectional view illustrating a first substrate, a second polarization layer and a touch panel, corresponding to I-I' line shown in FIG. 5.
Figure 6B:
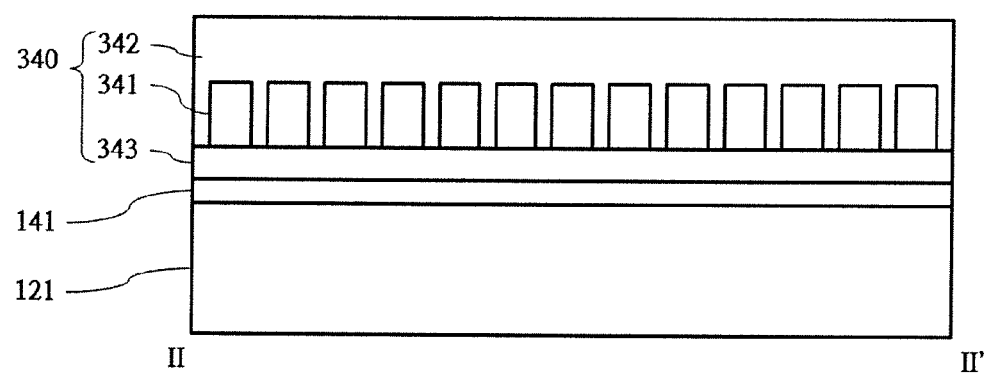
FIG. 6B is a XZ direction sectional view illustrating the first substrate, the second polarization layer and a waveguide, corresponding to II-II' line shown in FIG. 5.
Figure 7A:
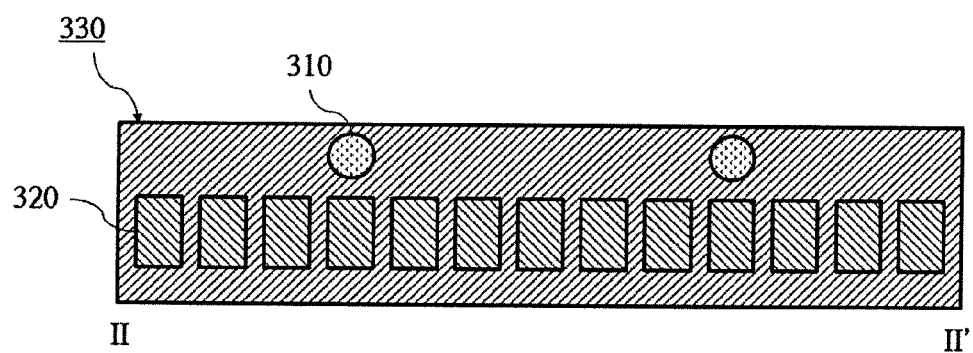
FIG. 7A is a diagram illustrating arrangement of light sources and sensors provided in the touch panel shown in FIG. 5 and FIGS. 7B to 7E are diagrams illustrating another examples of the arrangement of the light and the sensor.
Figure 7B:
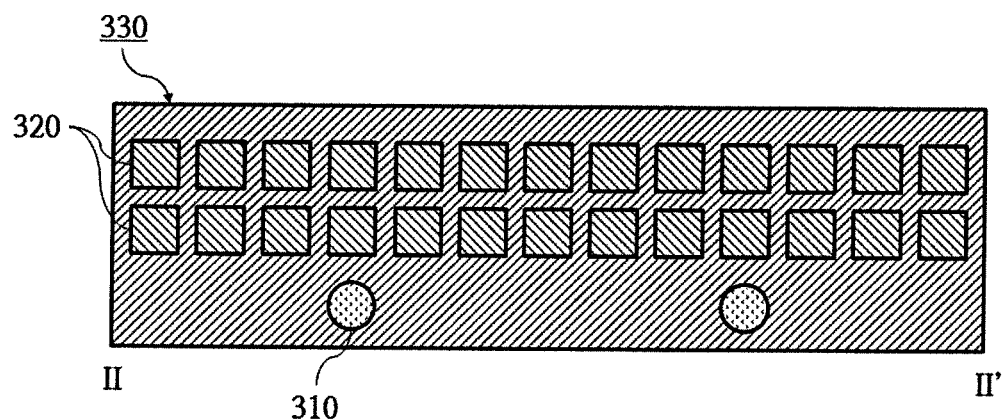
Figure 7C:
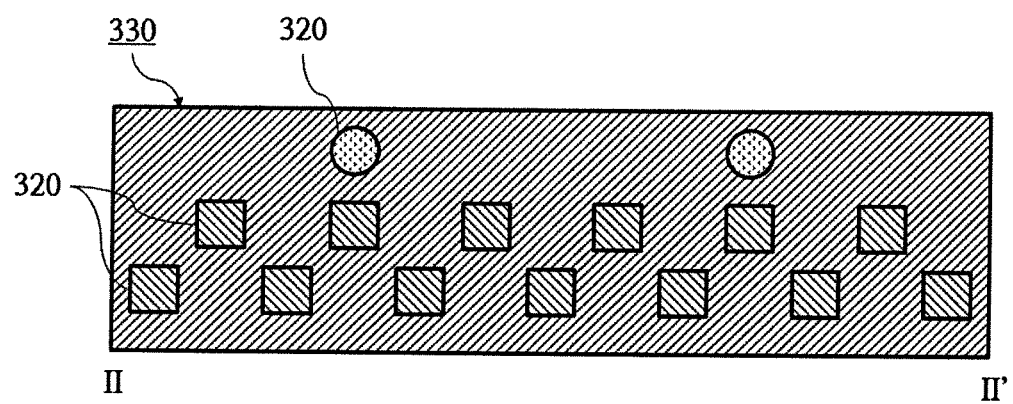
Figure 7D:
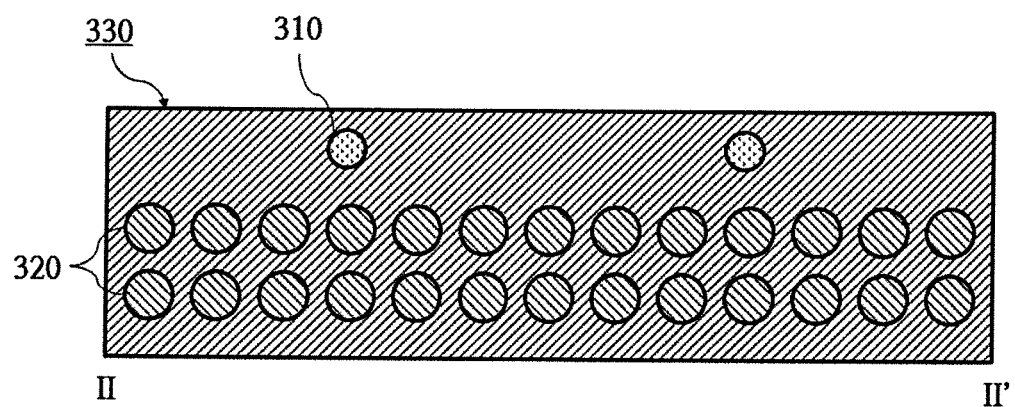

FIG. 2 is a sectional view illustrating a touch panel integrated display device according to a first embodiment of the present invention. FIG. 3 is a perspective view illustrating a TN mode liquid crystal panel of the touch panel integrated display device according to the first embodiment of the present invention. FIG. 4 is a perspective view illustrating an in-plain switching mode liquid crystal panel of the touch panel integrated display device according to the first embodiment of the present invention. FIG. 5 is a perspective view partially illustrating a touch panel of the touch panel integrated display device according to the first embodiment of the present invention. FIG. 6A is a YZ direction sectional view illustrating a first substrate, a second polarization layer and a touch panel, corresponding to I-I' line shown in FIG. 5, and FIG. 6B is a XZ direction sectional view illustrating the first substrate, the second polarization layer and a waveguide, corresponding to II-II' line shown in FIG. 5. FIG. 7A is a diagram illustrating arrangement of light sources and sensors provided in the touch panel shown in FIG. 5 and FIGS. 7B to 7E are diagrams illustrating other examples of the arrangement of the light and the sensor. FIGS. 8A and 8B are XY direction top views illustrating the waveguide shown in FIG. 5.

As shown in FIG. 2, the touch panel integrated display device according to this embodiment of the present invention includes a liquid crystal panel 100 for displaying images, a backlight unit 200 arranged in a back surface of the liquid crystal panel 100 to project lights toward the liquid crystal panel 100 and a touch part 300 arranged on a top peripheral area of the liquid crystal panel 100 to detect a touch generated at a top surface of the liquid crystal panel 100. According to the touch panel integrated display device shown in FIG. 2, the liquid crystal panel 100 may be replaced by something else such as a field emission display panel, an electroluminescence display panel, an electrowetting display panel, an organic electroluminescence display panel, etc. However, the display panel which is the liquid crystal panel will be embodied for convenience sake as follows.

If the liquid crystal panel 100 is a transmissive or transflective type, the touch panel integrated display device has to include a backlight unit 200. In contrast, if the liquid crystal panel 100 is a reflective type, the backlight unit 200 may not be provided. Further, if touch panel integrated the display device includes a display panel which emits itself, the device may not include the backlight unit 200.

The touch panel 300 according to the present invention is directly formed on a first substrate 121 of the liquid crystal panel 100 which will be described in detail later. Because of that, the touch panel 300 may not include an auxiliary supporting substrate, however it is referenced to as "panel" in the present specification for convenience sake. Here, the first substrate 121 is one of the pair of the substrates oppositely bonded to each other provided in the display panel, which includes a surface forming a touch region and emitting a light of the display panel.

The liquid crystal panel 100 shown in FIG. 2 includes a thin film array substrate 110 (hereinafter, 'TFT substrate') and a color filter array substrate 120 (hereinafter, 'CF substrate') bonded with each other oppositely, a liquid crystal layer 130 injected between the TFT substrate 110 and the CF substrate 120, a first polarization layer 140 formed on a back surface of the TFT substrate 110 to polarize a light incident to the liquid crystal layer 130 from a backlight unit 200, and a second polarization layer 141 formed on a top surface of the CF substrate 120 to polarize a light emitted from the liquid crystal layer 130 outside. Here, the CF substrate 120 includes a first substrate 121 formed of a material with transmissivity and insulation. A color array part 122 is formed on a back surface of the first substrate 121 and the touch part 300 is formed on a top surface of the first substrate 121.

Such the liquid crystal panel 100 may be classified, based on a direction of an electric field used to adjust directions of liquid crystal cells provided in the liquid crystal layer 130, into a twisted nematic (TN) mode and an In-plane switching mode.

As shown in FIG. 3, according to the TN mode liquid crystal panel, a TFT substrate 110a includes, a second substrate 111 in opposite to the first substrate 121, a plurality of gate lines 112 and a plurality of data lines 113 crossed with each other on the second substrate 111 to define a plurality of pixel regions (P), corresponding to a plurality of pixels, a plurality of thin film transistors (T) formed in intersections between the gate and data lines 112 and 113, respectively, and a plurality of pixel electrodes 114 formed corresponding to the plurality of the pixel regions (P), respectively, with being connected with the plurality of the thin film transistor (T), respectively.

According to the TN mode liquid crystal panel, a CF substrate 120a includes a first substrate 121 and a color filter array unit 122 formed on a back surface of the first substrate 121. The color filter array unit 122 includes a black matrix layer 1220 formed in an outer area of the pixel regions (P) of a back surface of the first substrate 121 to prevent light leakage in the outer area of the pixel regions, a color filter layer 1221 formed on the pixel regions (P) of the back surface of the first substrate 121, with being partially overlapped with the black matrix layer 1220, to respectively transmit predetermined colors corresponding to each of the pixels, there through, an overcoat layer 1222 formed level on the color filter layer 1221, and a common electrode 1123 formed on the overcoat layer 1222, corresponding to all of the pixels. Here, the color filter layer 1221 may be formed to emit a light having a wavelength range for one of red, green and blue colors, corresponding to the plurality of the pixel regions (P), respectively.

According to the TN mode liquid crystal panel having the above configuration, directions of liquid crystal cells provided in the liquid crystal layer 130 may be controlled based on an electric field applied to the liquid crystal layer 130 by a common voltage and pixel voltages applied to the common electrode 1223 and the pixel electrodes 114 arranged on and under the liquid crystal layer 130, from a state of directions of liquid crystal cells provided in the liquid crystal layer 130 being twisted at 90°. Because of that, a light transmittance of each pixel region (P) is adjusted and brightness of each pixel is controlled to display images.

In the meanwhile, as shown in FIG. 4, according to the in-plane switching mode liquid crystal panel, a TFT substrate 110b includes a second substrate 111, a plurality of gate lines 112 and a plurality of data lines 113 crossed with each other on a second substrate 110b to define a plurality of pixel regions (P) corresponding to a plurality of pixels, respectively, a plurality of thin film transistors (T) formed in intersections between the gate and data lines 112 and 113, respectively, a plurality of pixel electrodes 114 formed in the plurality of the pixel regions (P), respectively, with being connected with the plurality of the thin film transistors (T), respectively, and common electrodes 115 formed in the plurality of the pixel regions (P) to be alternated with the plurality of the pixel electrodes.

According to the in-plain switching mode liquid crystal panel, a CF substrate 120a includes a first substrate 121 and a color filter array unit 122 formed on a back surface of the first substrate 121. The color filter array unit 122 includes a black matrix layer 1220 formed in outer to the pixel regions (P) of a back surface of the first substrate 121 to prevent light leakage in the outer area of the pixel regions, a color filter layer 1221 formed in each of the pixel region, partially overlapped with the black matrix layer 1220 to transmit predetermined lights having colors corresponding to the pixel regions (P) there through, and an overcoat layer 1222 formed level on the color filter layer 1221. In other words, the CF substrate 120b of the in-plane switching mode liquid crystal panel may not include common electrodes, different from the TN mode. The color filter layer 1221 may be formed to emit a visible ray having a predetermined wavelength range for one of red, green and blue, corresponding to the plurality of the pixel regions (P), respectively.

The in-plane switching mode liquid crystal panel applies a common voltage and a pixel voltage to each common electrode 115 and each pixel electrode 114 arranged on an identical plane. After that, the in-plain switching mode liquid crystal panel may adjust directions of the liquid crystal cells included in the liquid crystal layer 130 according to a horizontal electric field, from a state of liquid cells provided in the liquid crystal layer 130 being aligned in parallel to an alignment layer (not shown), and a light transmittance of each pixel region (P) is adjusted. Because of that, brightness of each pixel is controlled to display images.

In other words, the TN mode liquid crystal panel adjusts the light transmittance of each pixel region (P) by using the vertical electric field applied to the liquid crystal layer 130. In contrast, the in-plain switching mode liquid crystal panel adjusts the light transmittance of each pixel region (P) by using the horizontal electric field (in-plain switching) generated in the liquid crystal layer 130.

As mentioned above, the first substrate 121 is formed of a material having transmissivity and insulation, for example, glass, acryl and the like. Since the first substrate 121 is formed to have transmissivity and insulation, the liquid crystal panel 100 may be stable electrically and lights emitted from the liquid crystal layer 130 may be transmitted with less loss. Because of that, an image quality of the liquid crystal panel may be improved.

In the meanwhile, the touch panel 300 is arranged on a top peripheral area of the liquid crystal panel 100. That is, if the second polarization layer 141 is provided on a top of the liquid crystal panel 100 as shown in FIG. 2, the touch panel 300 is formed on an edge region of a top surface of the second polarization layer 141. Alternatively, if the liquid crystal panel 100 does not include the second polarization layer 141, not shown in the drawings additionally, the touch panel 300 is formed on an edge region of a top surface of the first substrate 121. That is, the touch panel 300 is supported by the first substrate 121.

Such the touch panel 300 includes a plurality of light sources 310 comprising at least one light source 310 arranged at each edge of the top peripheral area of the liquid crystal panel 100, to emit lights toward the top surface of the liquid crystal panel 100, a plurality of sensors 320 arranged at edges of the top peripheral area of the liquid crystal panel 100, spaced apart from each other with an identical distance, to collect lights having passed over the top of the liquid crystal panel 100 from the light sources 310, a flexible printed circuit (hereinafter, "FPC") 330 connected with the plurality of the light sources 310 and the plurality of the sensors 320 to supply a driving voltage and to support the plurality of the light sources 310 and the plurality of the sensors 320, and a waveguide 340 for connecting the plurality of the sensors 320 to a sensor controller (not shown, referring a numeral reference "350" of FIG. 5) to guide the lights input to the sensors 320 to the sensor controller (not shown). At this time, the sensor controller senses whether each of the sensors collects light and it calculates a coordinate of a touch by combining coordinates corresponding to the sensors 320 not collecting the light.

As shown in FIG. 5, the waveguide 340 is positioned around the top peripheral area of the liquid crystal panel (100, see FIG. 2) and the FPC 330 is attached along an inner surface of the waveguide 340. At least one sensor controller 350 is positioned on the top peripheral area of the liquid crystal panel 100.

The plurality of the light sources 310 may be fixed to surfaces of the FPC 330, which is not contact with the waveguide 340, toward a top of the liquid crystal panel 100. The lights emitted from one of the light sources 310 are collected as effective lights not by all of the sensors 320, by only sensors 320 located in radiation intensity effective regions corresponding to the one of the light sources 310.

In other words, the top of the liquid crystal panel 100 is divided into the plurality of the radiation intensity effective regions corresponding to the plurality of the light sources 310, respectively. Using the positions, heights and light emission directions of the light sources 310, the plurality of the radiation intensity effective regions are set not to be overlapped with each other. The light collected by the sensor 320 arranged in one of the radiation intensity effective regions corresponding to one of the light sources, after emitted from one of the light sources 310, has a radiation intensity which can be sensed by the sensor controller 350 effectively. This feature will be described in detail later.

The plurality of the sensors 320 are fixed to surfaces of the FPC 330 toward the top of the liquid crystal panel 100, like the plurality of the light sources 310, spaced apart from each other with an identical distance at every edge of the top of the liquid crystal panel 100.

As shown in FIGS. 6A and 6B, the waveguide 340 includes a plurality of cores 341 connected with the plurality of the sensors 320, respectively, claddings 342 surrounding the cores 341, with a lower refractive index than a refection index of the cores, and a buffer layer 343 formed between the cores 341 and the liquid crystal panel 100. At this time, the height of the buffer layer 343 is adjusted such that the cores 341 may be arranged as high as the sensors 320 arranged in the FPC 330.

The FPC 330 having the sensors 320 arranged therein is attached to the waveguide 340, after the cores 341 and the sensors 320 are aligned to each other.

Figure 7E:
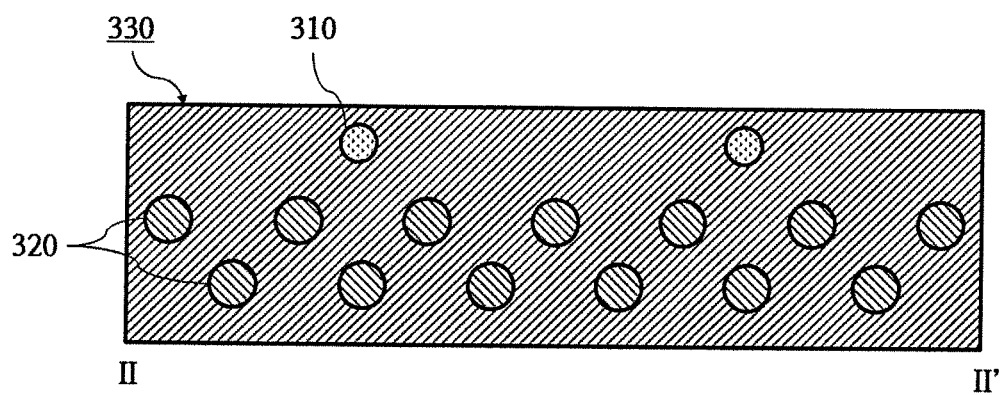
Figure 8A:
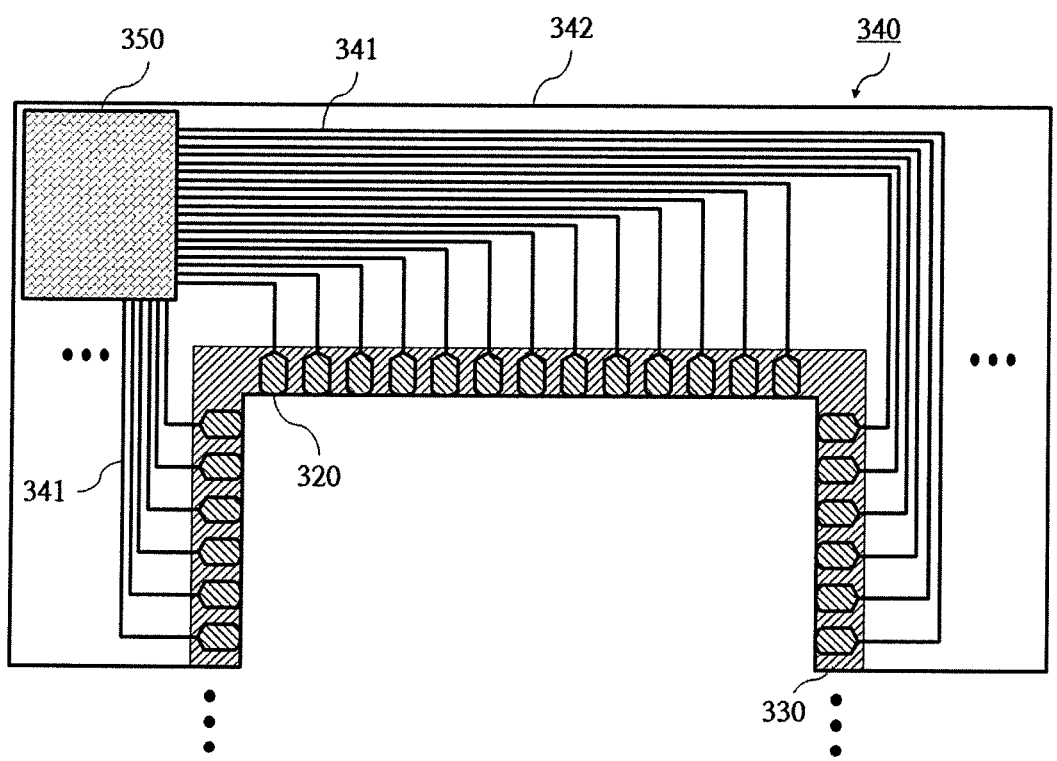
FIGS. 8A and 8B are XY direction top views illustrating the waveguide shown in FIG. 5.
Figure 8B:
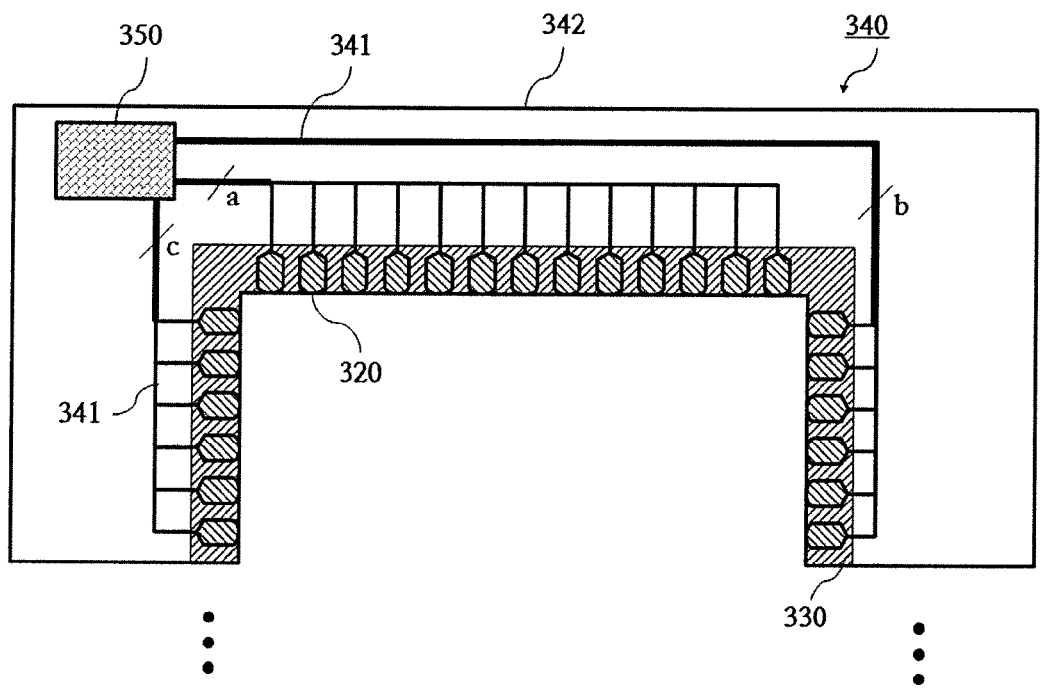

In the meanwhile, FIGS. 7A and 7E show an example of the light sources 310 and the sensors 320 arranged on the FPC 330, with respect to an edge of the top peripheral area of the liquid crystal panel 100.

That is, as shown in FIGS. 5 and 7A, the light sources 310 may be arranged on an upper area of a surface of the FPC 330 along "X" direction in parallel. The sensors 320 may be spaced apart from each other with an identical distance in a lower area of the surface of the FPC under the light sources 310, forming a single row along "X" direction (here, "row" refers to a horizontal row along "XZ" plane.

Alternatively, as shown in FIG. 7B, the positions of the light sources 310 and the sensors 320 are exchanged oppositely such that the light sources 310 may be arranged in the lower area of the surface of the FPC 330 along "X" direction in parallel and that the sensors 320 may be arranged in the upper area of the surface of the FPC 330, forming two rows along "X" direction, spaced apart from each other an identical distance from each other.

Although not shown in the drawings additionally, the sensors 320 arranged in the upper area of the surface of the FPC 330 may be arranged in a single row along "X" direction, not two rows, as shown in FIG. 7A. In addition, at least two sensor controllers 350 are provided in different portions of the top peripheral area of the liquid crystal panel 100. The sensors 320 arranged in each the edge are classified into both opposite sides ones, and connected to the different sensor controllers 350, respectively (hereinafter, "classified structure"). Because of that, the width increase of the waveguide 340 caused by the large number of the cores 341 connected to the sensor controllers 350 may be minimized.

When the sensors 320 are arranged in plural rows, the number of the sensors 320 may be increased, and thus a touch sensing sensibility corresponding to a unit area of a touch region may be increased. At the same time, the sectional areas of the cores 341 provided in the waveguide 340 may be reduced and the cores 341 may be arranged in the multi-layer structure. Because of that, the bezel width (or "width") of the waveguide 340 may be reduced. Furthermore, the bezel width of the waveguide 340 may be reduced in the classified structure which classifies the sensors 320*a* arranged in the edges (the surface of the top peripheral area) into both opposite side sensors and the classified sensors are connected to the different sensor controller 350, respectively.

Alternatively, as shown in FIG. 7C, light sources 310 may be arranged in the upper area of the surface of the FPC 330 in parallel along "X" direction and sensors 320 may be arranged in the lower area of the surface of the FPC 330 in two rows in zigzag along "X" direction, spaced apart from each other with an identical distance. According to FIG. 7B, the sensors 320*b* may be arranged in two rows along "X" direction having the same "Z" direction line (here, "line" refers to a column of XZ plane). In other words, different from FIG. 7B showing the matrix arrangement, the sensors 320 may be arranged in two X direction rows, alternating in the Z direction line. That is, the sensors arranged in a first row which is an upper X direction one of the two rows may be arranged in even number Z direction lines and the sensors 320 arranged in a second row which is a lower X direction one of the two rows may be arranged in odd number Z direction lines. When the sensors 320 are arranged in zigzag, the touch sensing sensibility of the unit areas of the touch region may be maintained without increasing the sectional area of the cores 341 or the number of the sensors 320. Because of that, the manufacture cost of the display device may be reduced and the reduced number of the sensors 320 may facilitate the control of the touch sensing.

Alternatively, as shown in FIGS. 7D and 7E, sensors 320 and 320 may be selected to have a circular section, not a rectangular section. The sensors 320 shown in FIG. 7D are the same as the sensors 320 shown in FIG. 7B, except a circular XZ section thereof, and repeated description of the sensors 320 will be omitted accordingly.

The sensors 320*d* shown in FIG. 7E are the same as the sensors 320 shown in FIG. 7C, except a circular XZ section thereof, and repeated description of the sensors 320 will be omitted accordingly.

In the meanwhile, FIGS. 7A and 7B shown an example of the cores 341 arranged corresponding to the sensors 320.

In other words, as shown in FIG. 7A, the cores 341 may be arranged in parallel along XY plane, spaced apart from each other with an identical distance, not to interfere with each other. Alternatively, as shown in FIG. 7B, the cores 341 may be partially overlapped with each other along XY plane to reduce the bezel width of the waveguide 340 and they may be spaced apart from each other with an identical distance along Z direction not to interfere with each other. Although not shown in the drawings, at least one of the cores 341 are classified to groups, and the groups may be partially overlapped with each other along XY plane, spaced apart from Z direction, to adjust the bezel width and height of the waveguide 340 to a proper level.

Figure 9:
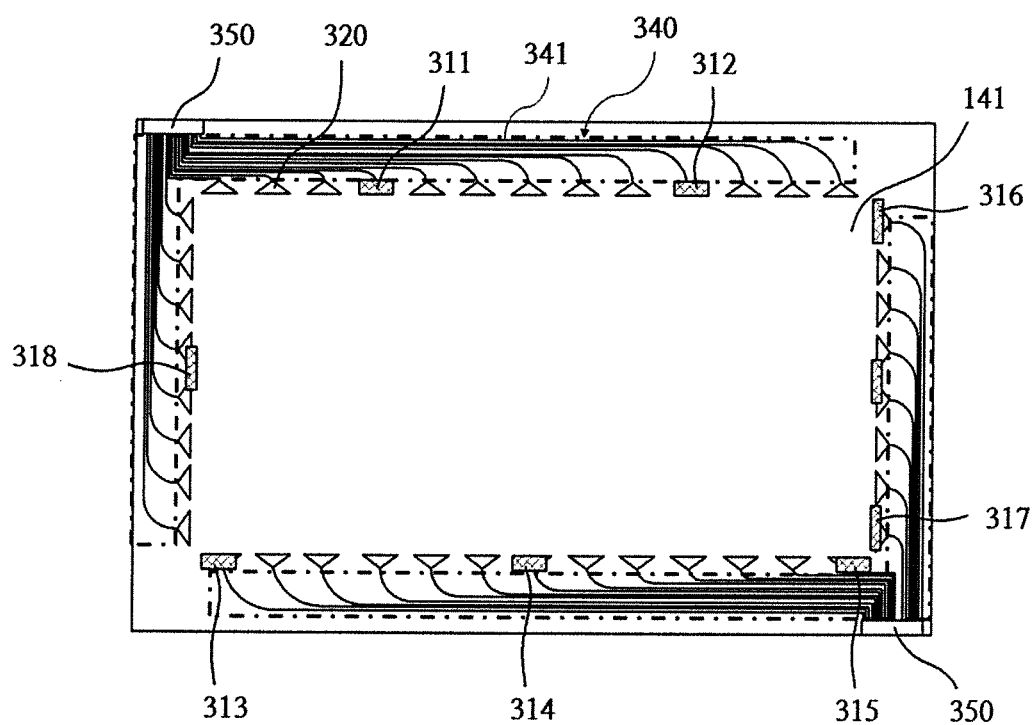
FIG. 9 is a plane view illustrating the touch panel of the touch panel integrated display device according to the first embodiment of the present invention.
Figure 10A:
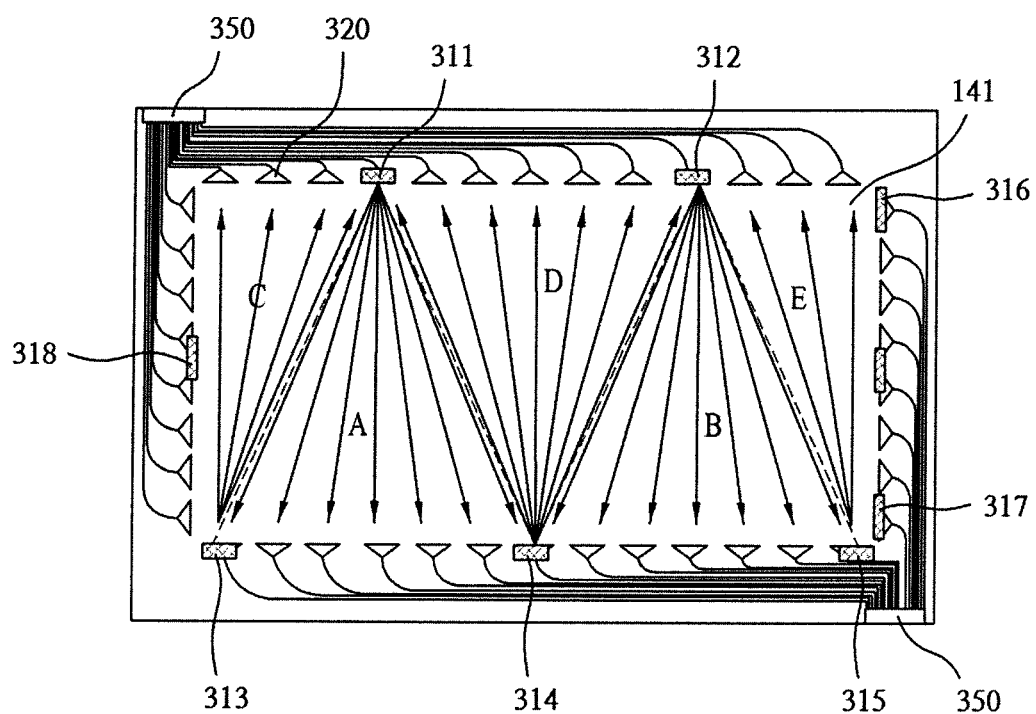
FIG. 10A is a diagram illustrating a light quantity effective region of light sources arranged in upper and lower edges of a top of the display panel in the plane view of FIG. 9.
Figure 10B:
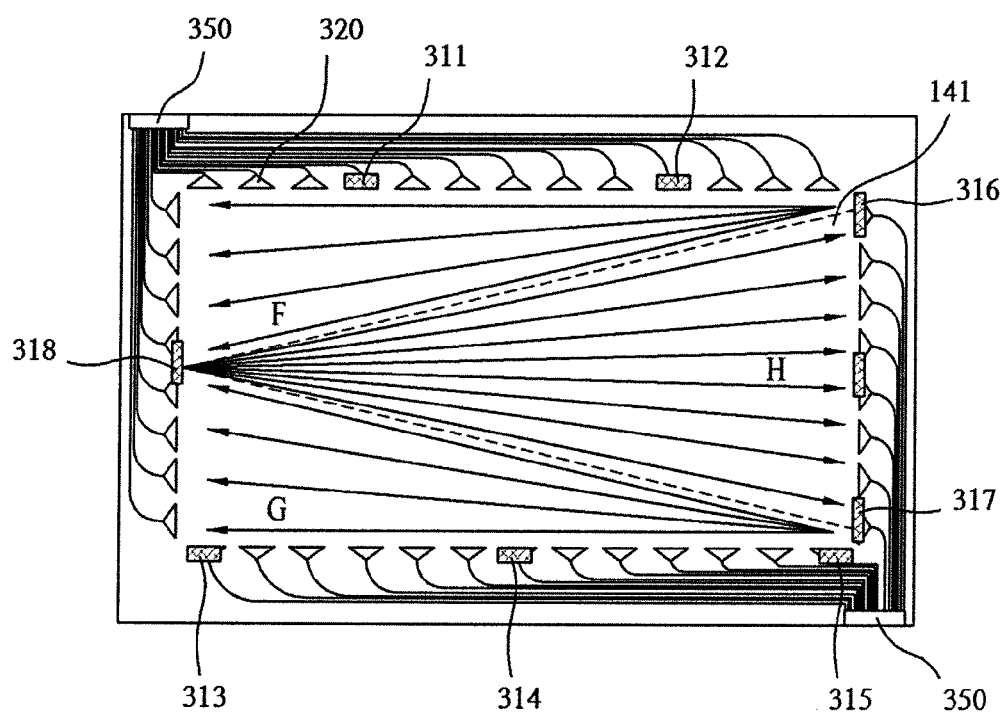
FIG. 10B is a diagram illustrating a light quantity effective region of light sources arranged in right and left edges of the top of the display panel in the plane view of FIG. 9.
Figure 11:
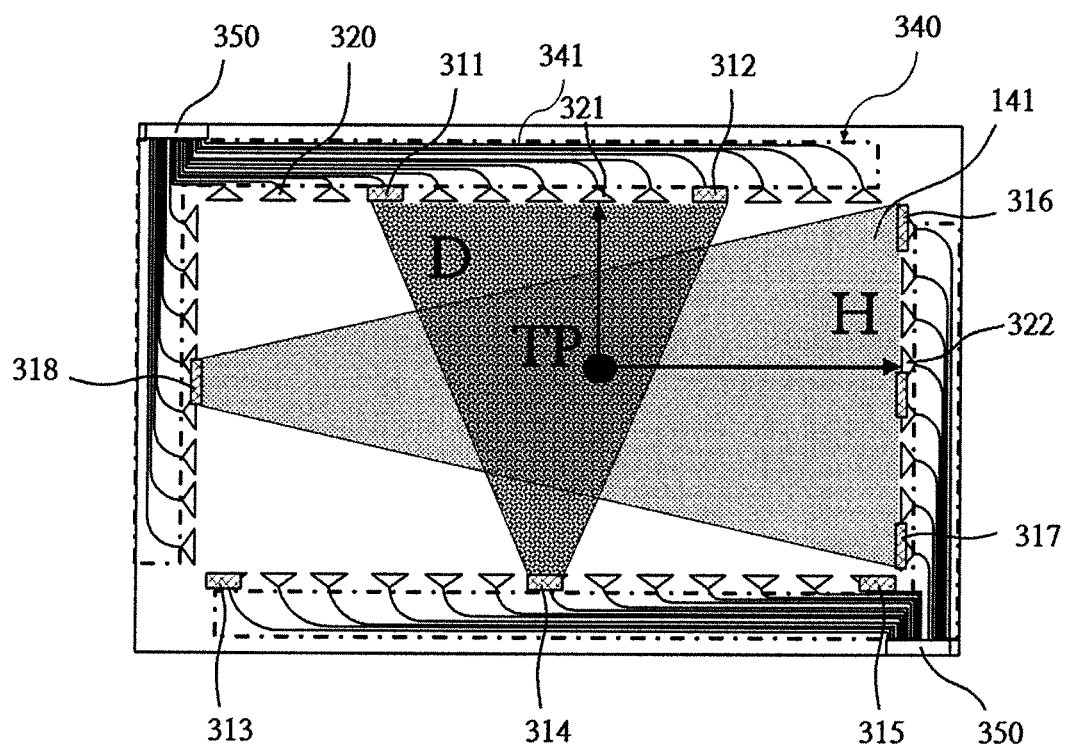
FIG. 11 is a diagram schematically illustrating a principle of detecting a touched point by using the touch panel according to the first embodiment shown in FIG. 9.
Figure 12:
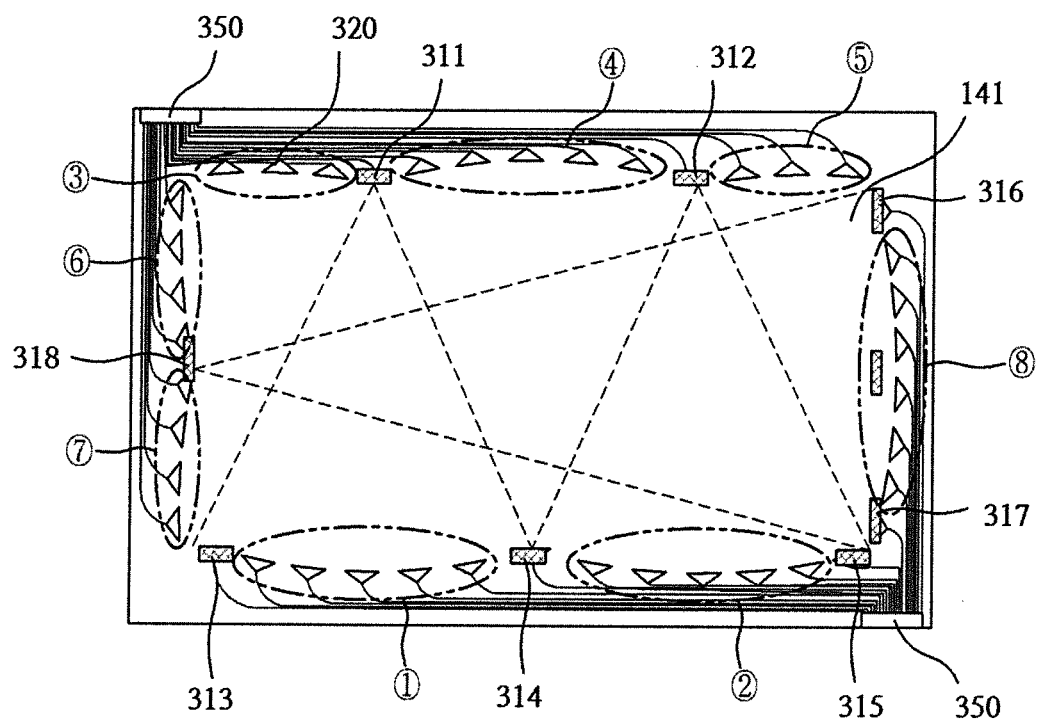
FIG. 12 is a plane view illustrating a touch panel of a touch panel integrated display device according to a second embodiment of the present invention.

As follows, in reference to FIGS. 9 to 12, the touch panel according to the first and second embodiments of the present invention will be described in detail. FIGS. 9 and 12 are plane views. To prevent elements shown in FIGS. 9 and 12 from confusingly mixed with each other, elements shown in FIGS. 9 and 12 may be illustrated in different patterns from the patterns of the elements shown in FIGS. 2 to 8B.

FIG. 9 is a plane view illustrating the touch panel of the touch panel integrated liquid display device according to the first embodiment of the present invention. FIG. 10A is a diagram illustrating radiation intensity effective regions of light sources arranged at upper and lower edges of a top of the display panel shown in the plane view of FIG. 9. FIG. 10B is a diagram illustrating radiation intensity effective regions of light sources arranged right and left edges of the top of the display panel shown in the plane view of FIG. 9. FIG. 11 is a diagram schematically illustrating a principle invented to detect a touch point by using the touch panel according to the first embodiment of the present invention shown in FIG. 9.

As shown in FIG. 9, the touch panel 300 according to the first embodiment of the present invention includes a plurality of light sources 311~318 (as shown "310" in FIGS. 2 and 3 to 8B) spaced apart from each other, positioned around a peripheral area of a top surface of the first substrate 121, to emit lights toward the top surface of the first substrate 121, a plurality of sensors 320 for collecting the lights having passed over the top of the first substrate 121, a waveguide 340 including cores 341 connected with the sensors 320, respectively, and a sensor controller 350 connected with the sensors 320 via the waveguide 340 to sense whether each of the sensors 320 collects light thereof. The waveguide 340 includes the plurality of the cores 341 which connects each of the sensors 320 to the sensor controller 350, are positioned not to interfering with each other, and are surrounded by the cladding (342, see FIGS. 6A and 6B).

The plurality of the light sources 311~318 may be formed of a plurality of light-emitting elements capable of emitting top surface lights with a wavelength corresponding to an ultraviolet ray (UV) or an infrared ray. The light-emitting element may be a light emitting diode (LED) or a lamp. The plurality of the light sources 311~318 emit the lights having the wavelength range corresponding to UV or infrared rays so that the light emitted from the light source 311~318 may not affect an image quality of the liquid crystal panel 100.

The plurality of the light sources 311~318 may be arranged in a top peripheral area of the liquid crystal panel 100, and may form a plurality of radiation intensity effective regions which are not overlapped with each other.

For example, as shown in FIGS. 10A and 10B, first to eighth light sources 311~318 may form A~H radiation intensity effective regions, respectively.

As shown in FIG. 10A, the first to fifth light sources 311~315 may form A~E radiation intensity effective regions along a vertical direction ("Y" direction shown in FIG. 5). As shown in FIG. 10B, the sixth to eighth light sources 316~318 may form F~H light quantity effective regions along a right-and-left direction.

As describing FIG. 10A in detail, the first light source 311 arranged at a portion (that is, a left portion shown in FIG. 10A) of a first edge (that is, an upper edge shown in FIG. 10A) of a top peripheral area formed in the second polarization layer 141 may emit top surface lights moving toward a second edge (that is, a lower edge shown in FIG. 10A) in opposite to the first edge, to form 'A' light quantity effective region. Here, top surface lights of the A region collected by some of the sensors 320 arranged in a portion of the second edge of the top peripheral area of the second polarization layer 141 may be sensed by the sensor controller 350 effectively.

Especially, although the top surface lights of 'A' radiation intensity effective region are collected by some of the sensors 320 located in 'B' radiation intensity effective region adjacent to 'A' radiation intensity effective region, the top surface lights have a radiation intensity which is smaller than an effective range and they cannot be sensed by the sensor controller 350 effectively.

Similar to the first light source 311, the second light source 312 arranged at an opposite portion (that is, a right portion shown in FIG. 10A) of the first edge of the top peripheral area of the second polarization layer 141 may emit top surface lights of 'B' region effectively collected by some of the sensors 320 arranged in an opposite portion of the second edge. The third light source 313 arranged at a portion of the second edge of the top peripheral area of the second polarization layer 141 may emit top surface lights of 'C' region effectively collected by some of the sensors 320 arranged in a portion of the first edge of the top peripheral area of the second polarization layer 141. The fourth light source 314 arranged a center portion of the second edge of the top peripheral area of the second polarization layer 141 may emit top surface lights of 'D' region effectively collected by some of the sensors 320 arranged in a center portion of the second edge of the top peripheral area of the second polarization layer 141. The fifth light source 315 arranged in an opposite portion of the second edge of the top peripheral area of the second polarization layer 141 may emit top surface lights of 'E' region effectively collected by some of the sensors 320 arranged in an opposite portion of the first edge of the top peripheral area of the second polarization layer 141.

As describing FIG. 10B in detail, the sixth light source 316 arranged in a portion (that is, an upper portion shown in FIG. 10B) of a third edge (that is, a right edge shown in FIG. 10B) of the top peripheral area formed in the second polarization layer 141 may emit top surface lights toward a portion of a fourth edge (in opposite to the third edge) of the top peripheral area of the second polarization layer 141, to form a light quantity effective region corresponding to 'F' region along a right-and-left direction. Here, top surface lights of 'F' region effectively collected by some of the sensors 320 arranged in a portion of the fourth edge of the top peripheral area of the second polarization layer 141, in opposite to the sixth light source 316 may be sensed by the sensor controller 350 effectively. If they are collected by the sensors 320 of 'G' radiation intensity effective region adjacent to 'F' radiation intensity effective region, the top surface lights of 'F' radiation intensity effective region have a radiation intensity which is smaller than an effective intensity range, not to be effectively sensed by the sensor controller 350.

Similar to the sixth light source 316, the seventh light source 317 arranged in an opposite portion (that is, a lower portion shown in FIG. 10B) of the third edge of the top peripheral area provided in the second polarization layer 141 may emit top surface lights of 'G' region effectively collected by some of the sensors 320 arranged in an opposite portion of the fourth edge of the top peripheral area provided in the second polarization layer 141. The eight light source 318 arranged in a center portion of the fourth edge of the top peripheral area provided in the second polarization layer 141 may emit top surface lights of 'H' region effectively collected by some of the sensors 321 arranged at the third edge of the top peripheral area provided in the second polarization layer 141.

As mentioned above, the top surface of the second polarization layer 141 is divided into A~E radiation intensity effective regions corresponding to the first to fifth light sources 311~315 along a vertical direction and into F~H radiation intensity effective regions corresponding to the sixth to eighth light sources 316~318 along a right-and-left direction. Because of that, when a touch touching any point located in the top surface of the second polarization layer 141 is generated, at least one of the sensors 320 arranged at the first and second edges of the top peripheral area provided in the second polarization layer 141, which fails to collect a top surface light generated by the touch, may be sensed and at least one of the sensors 320 arranged at the third and fourth edges which fails to collect a top surface light generated by the touch may be sensed. After that, coordinates corresponding to the sensed sensors may be detected to calculate a coordinate of the touch point.

That is, as shown in FIG. 11, when a touch point (TP) is generated, a first sensor 321 of 'D' radiation intensity effective region out of the sensors 320 arranged at the first and second edges and a second sensor 322 of 'H' radiation intensity effective region out of the sensors 320 arranged at the third and fourth edges fail to collect top surface lights. At this time, the touch controller 350 senses the first sensor 321 and the second sensor 322, which fail to collect the top surface lights, and it combines the positions of the first and second sensors 321 and 322, such that a coordinate of the touch point (TP) may be calculated.

Next, in reference to FIG. 12, the touch panel according to the second embodiment of the present invention will be described.

FIG. 12 is a plane view illustrating the touch panel of the touch panel integrated display device according to the second embodiment of the present invention.

As shown in FIG. 12, the touch panel 300 according to the second embodiment of the present invention is identical to the touch panel according to the first embodiment shown in FIGS. 2 to 11 described above, except sensors 320 arranged curvedly toward light sources 311~318 for radiation intensity effective regions (A~H), and repeated description between the two embodiments will be omitted accordingly.

In other words, like the touch panel according to the first embodiment, the touch panel 300 according to the second embodiment includes a plurality of light sources 311~318 spaced apart an identical distance from each other along an entire top peripheral area of a second polarization layer 141, to emit top surface lights, a plurality of sensors 320 for sensing the top surface lights passing the top surface of the second polarization layer 131, and a sensor controller 350 connected with the plurality of the sensors 320 via the waveguide 340, to sense whether each of the sensors 320 senses corresponding top surface lights. At this time, the waveguide 340 includes a plurality of cores 341 for connecting the plurality of the sensors 320 to the sensor controller 350, arranged not to interfere with each other and surrounded by claddings (342, see FIGS. 6A and 6B).

At least one of the sensors 320 of the corresponding radiation intensity effective region is curved toward the light sources forming the corresponding radiation intensity effective region. Sensors 320 corresponding to the radiation intensity effective regions are entirely arranged in a concave shape.

Specifically, a first group (①) of sensors for effectively collecting top surface lights of 'A' region emitted by the first light source 311 may be arranged curvedly toward the first light source 311. 'A' radiation intensity effective region and the first group (①) of the sensors may form a fan shape entirely.

A second group (②) of sensors effectively collecting top surface lights of 'B' radiation intensity effective region emitted by the second light source 312 may be curved toward the second light source 312 in a concave shape. 'B' radiation intensity effective region and the second group of the waveguides (②) may form a fan shape entirely.

Also, a third group (③) of sensors effectively collecting top surface lights of 'C' radiation intensity effective region emitted by the third light source 313 are curved toward the third light source 313 to be arranged in a concave shape. A fourth group (④) of sensors effectively collecting top surface lights of 'D' radiation intensity effective region emitted by the fourth light source 314 may be curved toward the fourth light source 314 to be arranged in a concave shape. A fifth group (⑤) of sensors effectively collecting top surface lights of 'E' radiation intensity effective region emitted by the fifth light source 315 may be curved toward the fifth light source 315 to be arranged in a concave shape. At this time, an overall profile of 'C' radiation intensity effective region and the third group (③) of the sensors may be in line symmetry to an overall profile of 'E' radiation intensity effective region and the fifth group (⑤) of the sensors, to form a divided fan shape.

A sixth group (⑥) of sensors effectively collecting top surface lights of 'F' radiation intensity effective region emitted by the sixth light source 316 may be curved toward the sixth light source 316 to be arranged in a concave shape. A seventh group (⑦) of sensors effectively collecting top surface lights of 'G' radiation intensity effective region emitted by the seventh light source 317 may be curved toward the seventh light source 317 to be arranged in a concave lens shape. An eighth group (⑧) of sensors effectively collecting top surface lights of 'H' radiation intensity effective region emitted by the eighth light source 318 may be curved toward the eighth light source 318 to be arranged in a concave lens shape. At this time, an overall profile of 'F' region and the sixth group (⑥) of the sensors and an overall profile of 'H' radiation intensity effective region and the seventh group (⑦) of the sensors may form a fan shape divided in line symmetry.

Commonly, lights have a property of straightness and light emitting elements have a property of emitting lights in all of directions (upward, downward, rightward and leftward) in a range of optical angles. The top surface lights emitted from the light sources 310 (311~318) are moved straight, with spreading in a conical shape on the top surface of the second polarization layer 141, to be input to the sensors 320. When the waveguides are arranged curvedly for light collecting surfaces of the sensors to be toward the light sources 310 (311~318), an area of the light collecting surfaces of the sensors 320 which is in contact with the top surface lights of 'A' region may be broad enough to increase the intensity of the top surface lights collected by the sensors 320. Because of that, the touch sensing sensitivity of the touch panel may be improved.

As mentioned above, the touch panel integrated display device according to the embodiment of the present invention includes the first substrate with the back surface having the color filter array 122 formed thereon and the top surface having the touch panel 300 formed thereon, to allow the color filter array substrate 120 and the touch panel 300 to share the first substrate 121. That is, the touch panel 300 is directly formed on the first substrate 121. As a result, the adhesive layer for bonding the touch panel 300 with the color filter array substrate 120 may be eliminated and the structure of the touch panel integrated display device may be simpler. In addition, durability deterioration generated by the adhesive layer may be prevented and the manufacture process may be efficiency, to enhance a yield. The touch panel 300 is formed on the first substrate 121 directly, without an auxiliary substrate. Because of that, the entire weight and thickness of the touch panel integrated display device may be reduced in comparison to the touch panel attached liquid crystal display device according to the prior art.

The lights generated from the light source 310 may reach the sensors 320 on the liquid crystal panel 100 along the path crossing the top surface of the liquid crystal panel. Because of that, the light path may be shorter than that of the prior art and the loss of the radiation intensity generated by the light path may be reduced. Assuming that the light sources emitting the same radiation intensity, the intensity of the lights reaching the sensors 320 may be increased in comparison to the conventional intensity of the lights according to the prior art. As a result, the touch sensing sensitivity may be enhanced.

In the meanwhile, as mentioned above, the conventional touch panel attached liquid crystal display device includes the two substrates provided on the touch panel and the color filter array substrate, respectively, and the adhesive layer for bonding the touch panel to the color filter array substrate. Because of that, the lights generated from the liquid crystal panel may be emitted outside only via a large number of interfaces having a variable refractive index.

However, the touch panel integrated display device according to the first and second embodiments of the present invention includes the touch panel and the color filter array substrate 120 which share the single substrate 121. The lights generated from the liquid crystal panel may be emitted outside only via a less number of interfaces. Because of that, the transmittance or the rate of the incident lights may be improved.

The above feature will be described in detail in reference to FIGS. 13A, 13B, 14A and 14B.

Figure 13A:
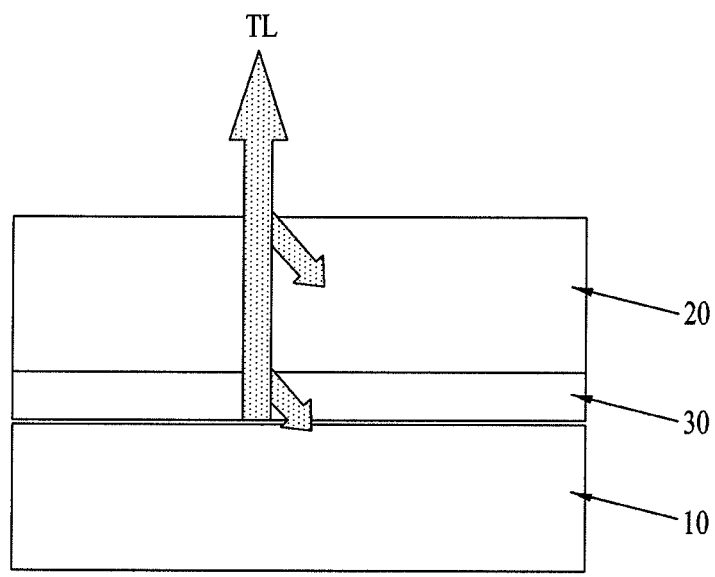
FIGS. 13A and 13B are diagrams of examples showing comparison between a light transmittance of the conventional touch panel attached liquid crystal display panel and a light transmittance of the touch panel integrated display device according to the embodiment of the present invention.
Figure 13B:
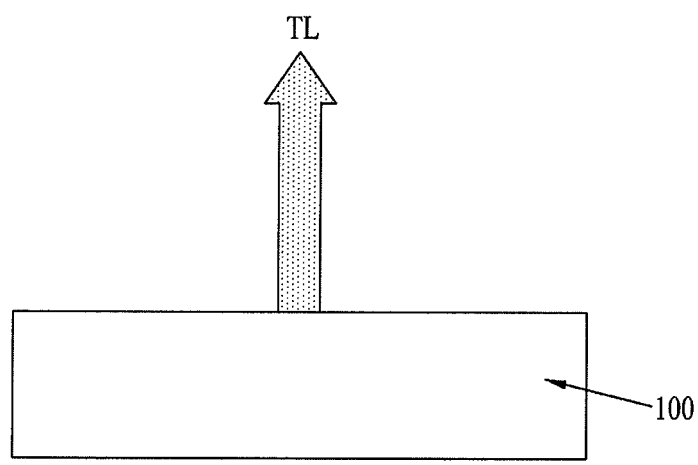
Figure 14A:
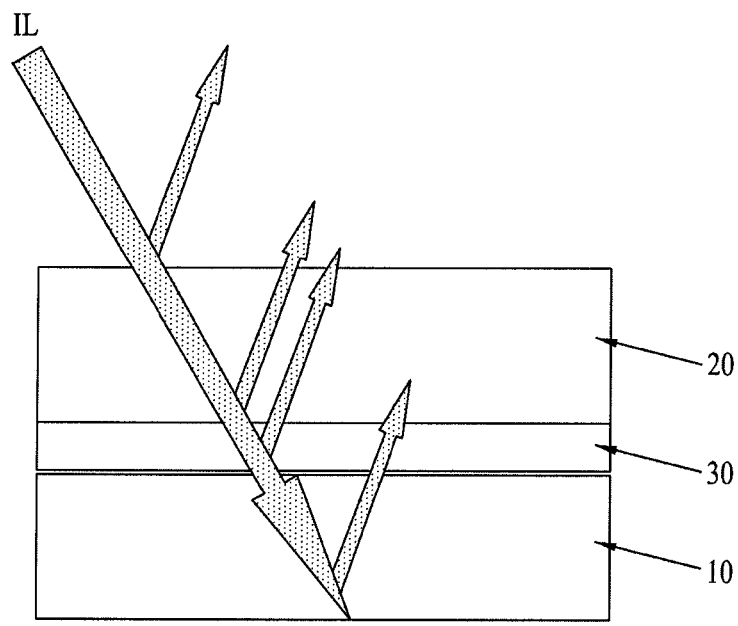
FIGS. 14A and 14B are diagrams of examples showing comparison between a rate of incident lights of the conventional touch panel attached liquid crystal display device and a rate of incident lights of the touch panel integrated display device according to the embodiment of the present invention.
Figure 14B:
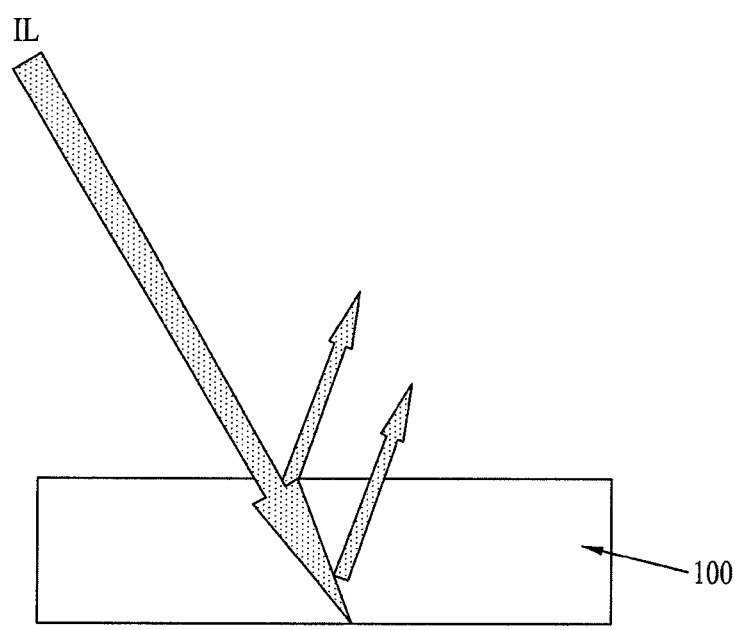

FIGS. 13A and 13B are diagrams of examples comparing a light transmittance of the conventional touch panel attached liquid crystal display device with a light transmittance of the touch panel integrated display device according to the embodiments of the present invention. FIGS. 14A to 14B are diagrams of examples comparing a rate of light incidence of the conventional touch panel attached liquid crystal display device with a rate of light incidence of the touch panel integrated display device according to the embodiment of the present invention.

As mentioned above, the conventional touch panel attached liquid crystal display device includes the two substrates provided in the touch panel and the color filter array substrate, respectively, and it has to include the adhesive layer 30 for bonding the two substrates with each other accordingly.

As shown in FIG. 13A, a transmitted light (TL) generated from the liquid crystal panel 10 may be emitted outside only via the adhesive layer 30 and the substrate of the touch panel. At this time, the transmitted light (TL) is reflected or lost by an interface having a variable light refractive index, that is, between the substrate and the adhesive layer and between the substrate of the touch panel 20 and the adhesive layer, such that the transmittance of the transmitted light cannot help deteriorating and that it may be limited to enhance the image quality.

In contrast, the touch panel integrated display device according to the first and second embodiments of the present invention has the structure allowing the touch panel 300 and the color filter array substrate 120 to share the first substrate 121.

Because of that, as shown in FIG. 13B, a transmitted light (TL) generated from the liquid crystal panel 100 may be emitted outside directly, without passing the substrate of the touch panel, such that the transmittance of the light may be enhanced in comparison to the prior art. Especially, according to the result of simulation, the transmitted light (TL) generated in the structure of the conventional touch panel attached liquid crystal display device has a transmittance of 92%. In contrast, it is identified that the transmitted light (TL) generated in the structure of the touch panel integrated display device according to the embodiment of the present invention has a transmittance of 100% with 8% of increase with respect to the transmittance of the transmitted light of the conventional touch panel attached liquid crystal display device.

Even in case the conventional touch panel attached liquid crystal display device includes the reflective liquid crystal panel like the transmissive type liquid crystal panel, an incident external light (IL) may be incident on the liquid crystal panel 10 only via the touch panel 30 and the adhesive layer 40. Because of that, the incident light (IL) is reflected or lost on a boundary surface between the outside and the touch substrate 30, a boundary surface between the touch panel 30 and the adhesive layer 40 and a boundary surface between the adhesive layer 40 and the liquid crystal panel 10, where a refractive index is varied.

In contrast, according to the first and second embodiments of the present invention as shown in FIG. 14a, an incident external light (IL) is incident on the liquid crystal panel 100 directly. Because of that, the lights may be reflected or lost only by a boundary surface between the outside and the liquid crystal panel 100. Especially, according to the result of simulation, it is identified that the touch panel integrated display device according to the embodiment of the present invention has a reflectivity of the incident external light (IL) which has 7% of decrease with respect to the reflectivity of the conventional touch panel attached liquid crystal display device.

As a result, the touch panel integrated display device according to the first and second embodiment of the present invention has the structure which allows the touch panel and the color filter array substrate to share the single substrate. Because of that, the entire weight and thickness may be reduced, with a slim design, and portability of the touch panel integrated display device may be enhanced. In addition, the simpler structure makes the manufacture process performed more smoothly and it can improve the transmittance or incidence rate of the transmitted lights or incident lights may be improved in comparison to the structure of the conventional touch panel attached liquid crystal display device. As a result, the image quality may be improved and the intensity of the top surface lights reaching the sensors can be prevented from being reduced by the light path, to enhance touch sensing efficiency.

In the meanwhile, the touch part 300 shown in FIGS. 2 to 15 is one of examples presented to explain the embodiments of the present invention schematically and the touch panel integrated display device according to the present invention is not limited thereto. That is, a predetermined number of light sources, not the eight light sources, may be provided according to the capacity of the light sources or the light sources arranged along the horizontal direction and those arranged along the vertical direction may have different functions. Because of that, the shape and number of the light quantity effective regions may be variable. In addition, the touch part 300 shown in FIGS. 10 to 12 is presented to include two sensor controller 350 322 and this is one of examples. In case of including a channel connected with the entire waveguides, a single sensor controller 350 may be provided or two or more sensor controllers 350 may be provided according to the number of channels which can be processed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A touch panel integrated display device comprising:
a display panel comprising first and second substrates facing each other and a plurality of pixels disposed between the first and second substrates, to display an image;
a touch panel formed on a peripheral area of a top most surface of the display panel and supported by the first substrate, to sense a touch generated on the top most surface of the display panel,
wherein the touch panel comprises,
a plurality of light sources formed at all edges of the peripheral area, at least one of the plurality of light sources arranged at each edge of the peripheral area, respectively, each light source emitting light towards an opposite edge of the peripheral area;
a plurality of sensors formed at the all edges of the peripheral area and spaced apart from the plurality of light sources in a vertical direction, two or more sensors of the plurality of sensors being spaced apart from each other with an identical distance at the each edge of the peripheral area, wherein each sensor collects light which is emitted from one of the plurality of light sources formed at the opposite edge of the peripheral area;
a waveguide formed at the all edges of the peripheral area and comprising a plurality of cores connected with the plurality of the sensors and a cladding surrounding the plurality of the cores, with a lower refractive index than the plurality of the cores;

a flexible printed circuit formed along an inner surface of the waveguide, supplying each driving voltage to the plurality of light sources and the plurality of sensors; and a sensor controller connected with the plurality of the sensors via the plurality of cores, to sense whether each of the sensors collects light and to calculate a coordinate of the touch.

2. The touch panel integrated display device of claim 1, wherein the plurality of the light sources emit light with a wavelength range corresponding to an ultraviolet ray or an infrared ray.

3. The touch panel integrated display device of claim 1, wherein the top most surface of the display panel is divided into a plurality of radiation intensity effective regions corresponding to the plurality of the light sources, respectively;

wherein each radiation intensity effective region corresponds to one light source and includes at least one sensor which is arranged at the opposite edge to the one light source and collects the light emitted from the one light source, wherein the light which is emitted from the one light source and collected by the at least one sensor in each radiation intensity effective region has a predetermined radiation intensity or more, and wherein the predetermined radiation intensity is sensed by the sensor controller effectively.

4. The touch panel integrated display device of claim 3, wherein the at least one sensor included in each radiation intensity effective region is arranged in a concave lens shape towards the one light source corresponding to each radiation intensity effective region.

5. The touch panel integrated display device of claim 1, wherein the plurality of the sensors are arranged at each edge of the top most surface of the display panel in at least one row.

6. The touch panel integrated display device of claim 1, wherein the plurality of the sensors are arranged in at least two rows as to be zigzag-shaped at each edge of the top most surface of the display panel.

7. The touch panel integrated display device of claim 1, wherein the plurality of light sources are arranged in an upper portion at each edge of the top most surface of the display panel, than the sensors.

8. The touch panel integrated display device of claim 1, wherein the display panel is a liquid crystal panel comprising a transistor array substrate and a color filter array substrate bonded oppositely with each other and a liquid crystal layer filled between the transistor array substrate and the color filter array substrate; and wherein the transistor array substrate comprises, the second substrate;

a plurality of data lines and a plurality of gate lines crossed with each other on the second substrate, to define a plurality of pixel regions corresponding to the plurality of the pixels;

a plurality of thin film transistors formed at intersections between the gate lines and the data lines, respectively; and a plurality of pixel electrodes formed at the plurality of the pixel regions on the second substrate, to be connected with the plurality of the thin film transistors, respectively; and wherein the color filter array substrate comprises the first substrate and a color filter array part formed on a back surface of the first substrate in opposite to a surface of the first substrate by which the touch panel is supported.

9. The touch panel integrated display device of claim 8, wherein the color filter array part comprises, a black matrix layer formed in an outer area of the pixel regions formed on the back surface of the first substrate, to block the light leakage in the outer area of the pixel regions;

a color filter layer formed in the pixel regions formed on the back surface of the first substrate, to transmit lights with a wavelength range corresponding to the pixels; and an overcoat layer formed flat on the color filter layer.

10. The touch panel integrated display device of claim 8, wherein the liquid crystal panel further comprises, a backlight unit formed under the transistor array substrate to emit lights to the liquid crystal layer;

a first polarization layer formed on a back surface of the second substrate to polarize the lights emitted from the backlight unit; and a second polarization layer formed on a top surface of the first substrate to polarize lights passing through the liquid crystal layer.

* * * * *